April 22, 1947.                    J. R. CLARK                          2,419,438
                    TELESCOPING-RETRACTING HOOK FOR AIRCRAFT
                    Filed Dec. 18, 1944                3 Sheets—Sheet 1

Inventor
J. R. Clark,
By
J. F. Bush
Attorney

April 22, 1947.    J. R. CLARK    2,419,438
TELESCOPING-RETRACTING HOOK FOR AIRCRAFT
Filed Dec. 18, 1944    3 Sheets-Sheet 2
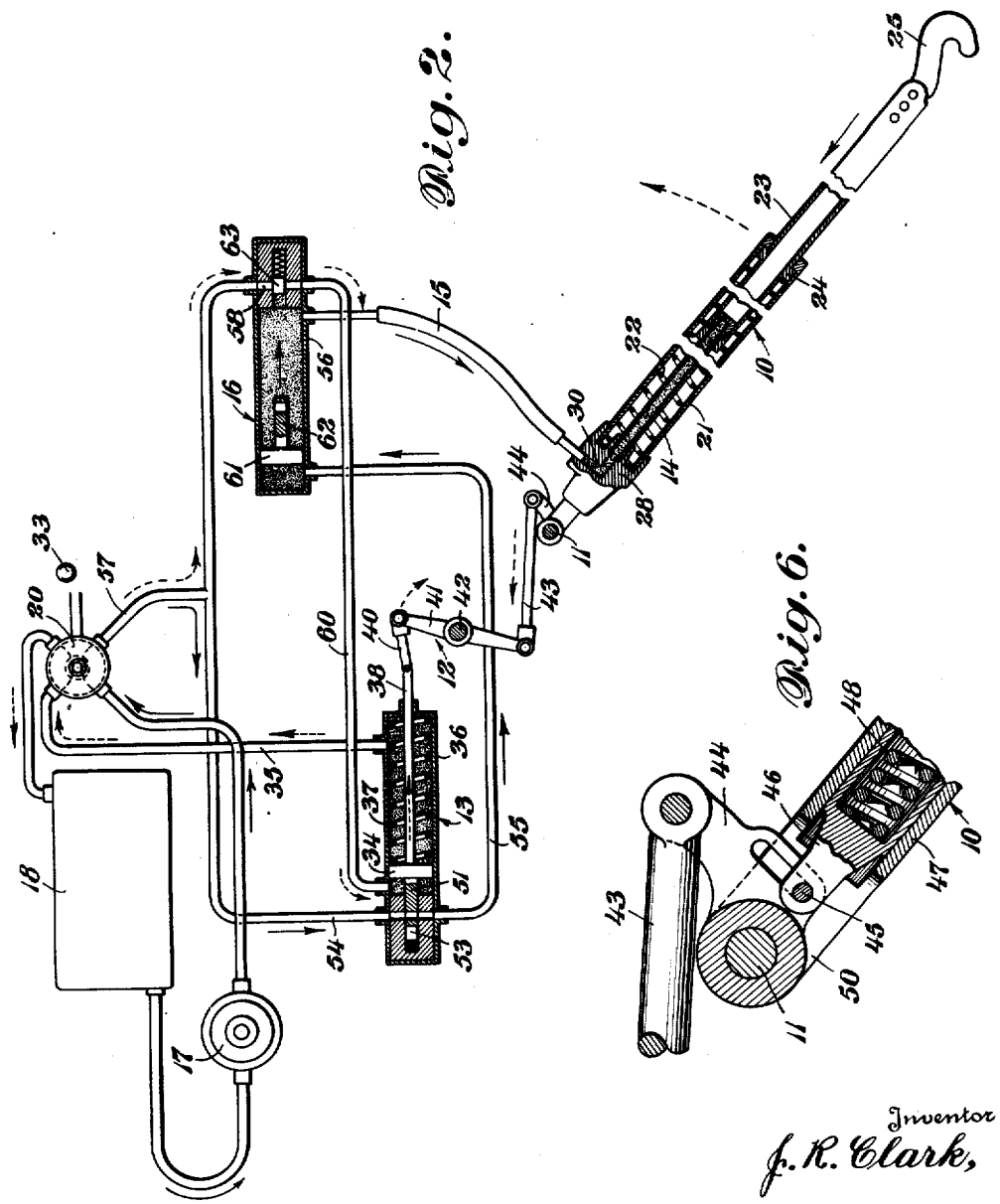

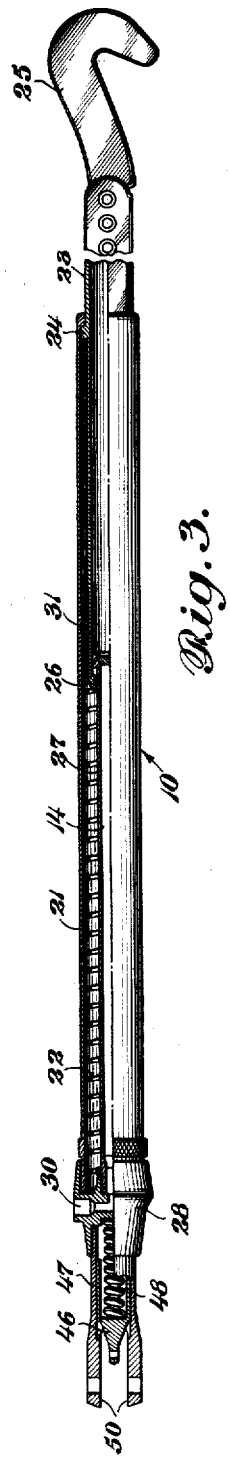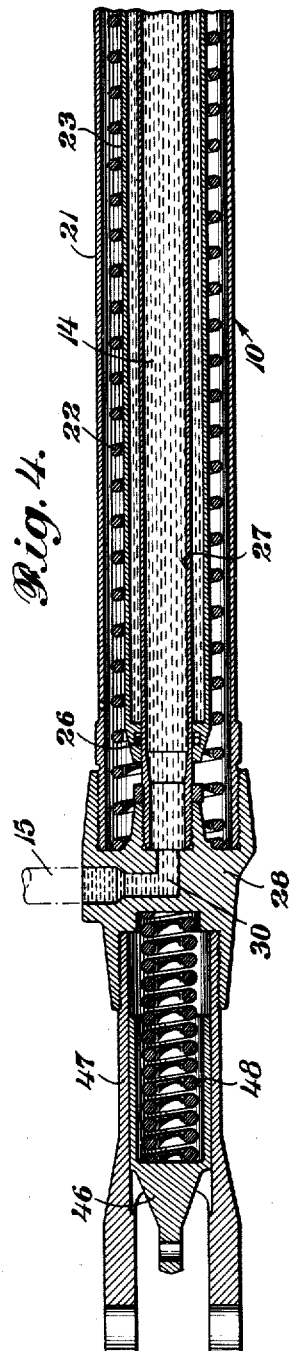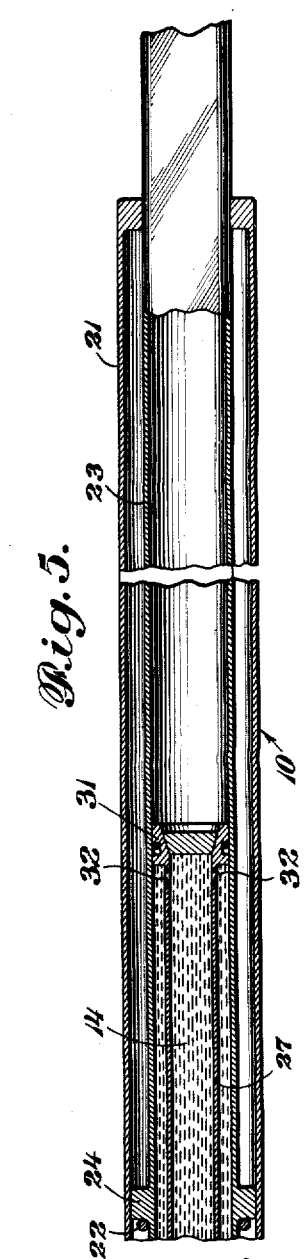

Patented Apr. 22, 1947

2,419,438

UNITED STATES PATENT OFFICE 2,419,438

TELESCOPING-RETRACTING HOOK FOR AIRCRAFT

John Russell Clark, Stratford, Conn., assignor to United Aircraft Corporation, East Hartford, Conn., a corporation of Delaware Application December 18, 1944, Serial No. 568,771

9 Claims. (Cl. 244—110)

This invention relates to a telescoping retracting hook for aircraft particularly adapted for use as an arresting hook gear installation, but is also adaptable to other types of usage such as mail pick-ups, etc.

A further object of this invention is to provide an arresting hook on aircraft where the space available is more limited than the hook length that is needed for operation.

A still further object of this invention is to provide an arresting hook which is hydraulically controlled for moving it from a non-operative position within the aircraft to an operative position below the aircraft and then to extend the hook to the full operative length and which thereafter may be operated to telescope the hook to its minimum length and then return the hook to the non-operative position within the aircraft.

A still further object of this invention is to provide a hydraulically operated telescoping retracting hook which is hydraulically operated and which also uses spring means for extending the hook to its maximum length.

A further object of this invention is to provide a telescoping retracting hook which is normally hydraulically operable from non-operative to operative position and back to non-operative position, but which in case of failure of the hydraulic system is automatically moved to the operative position, thus insuring that the hook normally carried in non-operative position will be moved to the operative position should the hydraulic system be damaged as in combat.

With the foregoing and other objects in view, as will hereinafter become apparent, this invention comprises the construction, combination and arrangement of parts hereinafter set forth, claimed and illustrated in the accompanying drawing, wherein:

Fig. 2 is a similar view showing the hook being retracted and raised.

Fig. 3 is a partly sectional, partly elevational view of the hook in extended position.

Figs. 4 and 5 are enlarged sectional fragmentary views of the hook jack, and

Fig. 6 is an enlarged sectional fragmentary view of the hook jack and linkage system connection.

Figure 1:
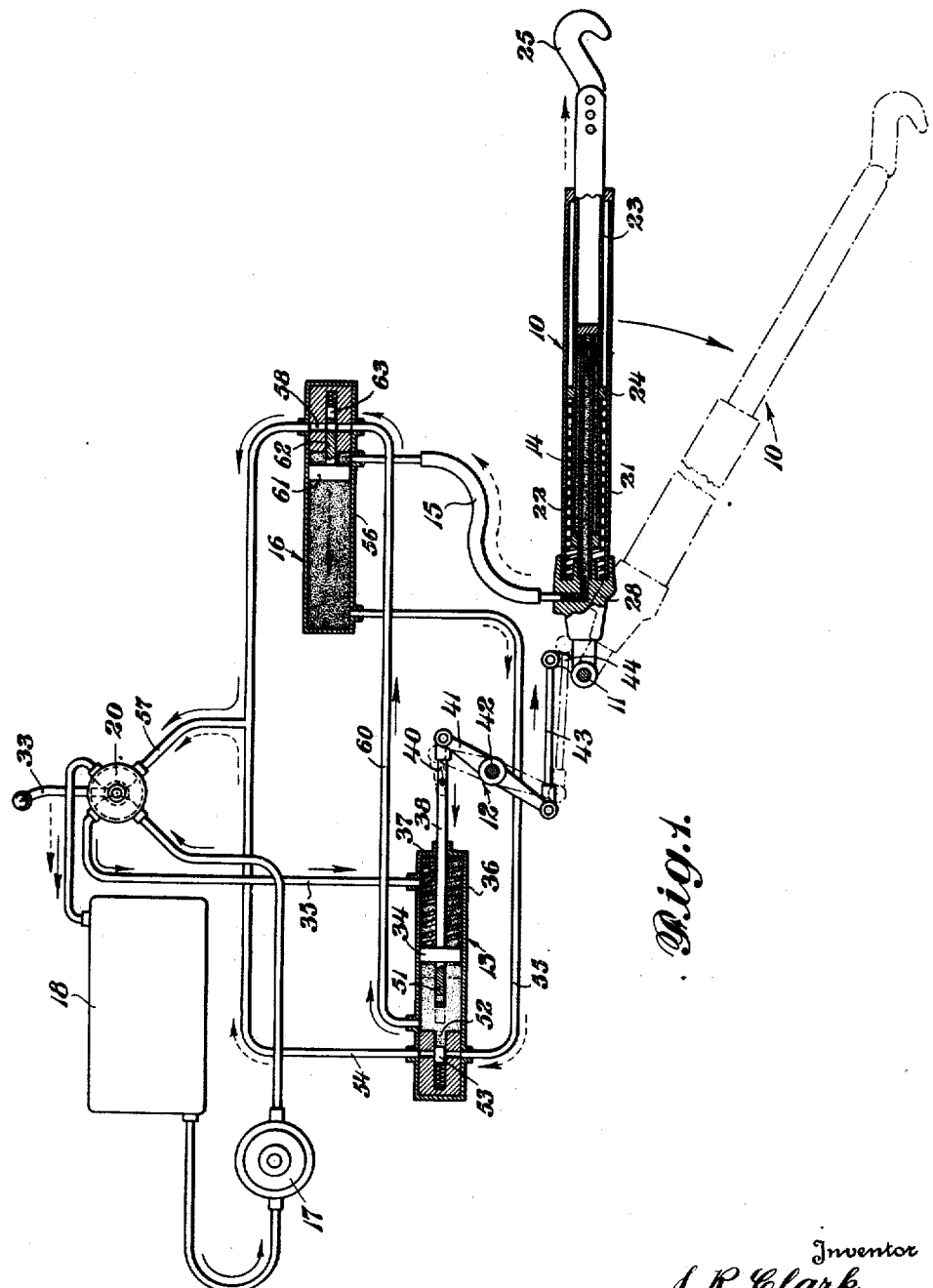
Fig. 1 is a schematic partly sectional view of this invention showing the hook in the process of being lowered and extended.

The telescoping arresting hook of this invention shown generally at 10 is pivoted on a fixed pivot 11 mounted in the aircraft in such a position that the hook 10 may rest within an appropriate recess or groove in the bottom of the aircraft when in retracted raised position and may be operated to a lowered extended position at an angle to the bottom of the aircraft. The angle of the hook 10 is controlled by a linkage system shown generally at 12 which in turn is operated by a linkage jack 13. The telescoping retracting hook 10 also includes an internal hook jack 14 which is connected by a flexible tubing 15 to a dummy jack 16. A one-way oil pump 17 and an oil reservoir 18 are connected through a four-way control valve 20 and suitable hydraulic connections to the linkage jack 13 and the dummy jack 16.

The hook jack 14 of the telescoping retracting hook 10 includes an external barrel 21 within which is a strong coil spring 22 which tends to expand and move an internal telescopic sleeve 23 to the maximum extended position permitted by a flange 24 adapted to abut against the internal end of barrel 21, the sleeve 23 having a hook element 25 mounted on the outer end thereof. The inner end of the sleeve 23 is provided with an internal packing gland 26 adapted to make a leak-proof sliding joint over an inside barrel 27 secured to the barrel base 28. This barrel base 28 is connected to the flexible tube 15 which leads through a passage 30 to the inside of inner barrel 27 whose other end is provided with an external gland 31 making a leak-proof slide joint with the inner surface of sleeve 23, thereby providing a chamber between the glands 26 and 31.

The barrel 27 is provided with apertures 32 at its end permitting fluid to pass therethrough into the chamber thus formed between the sleeve gland 26 and the inner barrel gland 31. As will be apparent, fluid entering from the flexible cable 15 through the passage 30 into the inner barrel 27 will pass through the apertures 32 to enlarge the chamber between the glands 26 and 31, and as this chamber enlarges it retracts the hook sleeve 23 within the outer barrel 21 against the force of spring 22 and thus shortens the hook to its minimum length. On the other hand, when the fluid is permitted to escape through the passageway 30, the spring 22 is free to expand against the flange 24 of sleeve 23 and thus move the hook element 25 to its most extended position. Tube 23 which slides through end cap of outer cylinder 21 may be squared, so that hook head 25 may be constrained from turning if desired.

When it is desired to lower the hook element 25, the handle 33 of the four-way control valve 20 is placed in the up position shown in Fig. 1 and connects the pump 17 to the linkage jack 13 on the piston rod side of the linkage jack piston 34 by means of a hydraulic tube 35. Also located within the cylinder 36 of jack 13 is a coil spring 37 which tends to move the piston 34 in the same direction that it will be moved by the fluid from the hydraulic tube 35. The linkage jack piston 34 is provided with a piston rod 38 pivoted to a connecting link 40 which in turn is pivoted on a rocker lever 41 of the linkage system 12.

The rocker lever 41 is pivoted at 42 to a fixed part of the aircraft and has a rod 43 connecting it to a bifurcated link 44 pivoted on the pivot 11 in the aircraft. The link 44 has a pin and slot connection 45 securing it to a sleeve 46 movable within a shock absorbing cylinder 47 against a shock absorbing spring 48 therewithin, the other end of the spring being based against the barrel base 28. The shock absorbing cylinder 47 is provided with a pair of extending bifurcations 50 by means of which the barrel base 28 is mounted on the pivot 11.

Within the linkage jack 13 the side of piston 34 opposite from the piston rod 38 is provided with an extending boss 51 adapted to enter a corresponding aperture 52 and abut against a spring pressed valve 53 which otherwise blocks off a connection between a hydraulic tube 54 and a connecting hydraulic tube 55. The hydraulic tube 55 connects to the cylinder 56 of dummy jack 16 while the hydraulic tube 54 connects both to the control valve 20 by way of a branch 57 and to a connection valve 58 through the dummy jack 16 to a hydraulic tube 60 which in turn is connected to the cylinder 36 of the linkage jack 13. The dummy jack 16 is provided with a piston 61 having an extended boss 62 on one side thereof adapted to operate against a spring pressed valve 63 to open or close the connection valve 58 between the hydraulic tube 54 and 60.

In operation, with valve control handle in up position, the hook 25 is moved from its retracted up position to its extended down position. Fluid coming from the reservoir 18 by way of pump 17 through valve 20 goes by tube 35 as shown by the full line arrows in Fig. 1 to the spring side of the piston 34 in the linkage jack 13. This moves the piston 34 until the boss 51 opens valve 53 to connect tubes 54 and 55. During this motion of piston 34 and rod 38, the linkage system 12 operating through link 43 about pivot 11 has caused the telescoping retracting hook 10 to move from the up position, shown in full lines, to the down position. Meanwhile, the fluid already in the cylinder 36 of linkage jack 13 on the boss side of 34 escapes through the tube 60, the valve connection 58, and branch tube 57, through control valve 20 back to the reservoir thus completing the first action. Then with tubes 54 and 55 connected, fluid already in the cylinder 56 of dummy jack 16 commences to escape therefrom as shown by the dash-line arrows in Fig. 1 as the piston 61 is moved by fluid entering therein from the flexible tube 15 under the force of coil spring 22 in the dummy jack as it moves the hook sleeve 23 to its extended position and forces the fluid out of the chamber between the sleeve gland 26 and the barrel gland 31, thus completing the second action and leaving the hook element 25 in its lowered extended position ready for use. As the hook element 25 hooks on to whatever object it is intended to catch, slight pivotal movement and shock absorbing is provided by means of the spring 48 and its cylinder 46.

When it is desired to retract and raise the hook element 25 from the extended position to the non-operative position, the control valve handle 33 is moved to the position 33' shown in Fig. 2. The pump 17 is then connected by means of branch tube 57 and tube 54 through valve 53 across the linkage jack cylinder 36 to tube 55 as shown by the full-line arrows in Fig. 2 to fill the cylinder 56 and move the piston 61, thereby forcing the fluid on the other side out through a tube 15 through passage 30 and inner barrel 28 and aperture 32 to enlarge the chamber between the barrel gland 31 and sleeve gland 26, thus drawing the hook sleeve 26 inside the outer barrel 21 against the action of coil spring 22. As this third action is completed the boss 62 operates valve 63 to open the connection 58 between branch tube 57 and tube 60. This causes fluid pressure to then operate as shown by dash-line arrows in Fig. 2 against piston 34 in linkage jack cylinder 36 and move connecting rod 38 to operate linkage system 12 and move the hook 10 about its pivot 11 to the raised position, the fluid on the other side of piston 34 escaping through tube 35 and control valve 20 back to reservoir 18. As will be apparent, with the completion of this fourth action, the valve 53 is in a closed position shown in Fig. 1, thus holding the piston 61 in the position shown in Fig. 1 and preventing the fluid in the hook jack 14 from escaping under the action of the spring 22. Should the hydraulic system fail for any reason as by one of the hydraulic tubes being punctured, the pressure will be released from the system whereupon the spring 37 in linkage jack 13 would automatically lower the hook 10 and the spring 22 in hook jack 14 would automatically extend the hook element 25, thus insuring that the hook will be in the extended operating position ready for the aircraft to land on its carrier if the hook is used as an arresting hook.

Other modifications and changes in the proportions and arrangements of the parts may be made by those skilled in the art without departing from the nature and scope of the invention, as defined in the appended claims.

What is claimed is:

1. A telescoping retracting hook for aircraft comprising an extendable retractable hook device adapted to be pivotally mounted on an aircraft, and hydraulic means for positively moving said hook device between a non-operative raised position and an operative lowered position and for positively extending and retracting said hook device while in the lowered operative position.

2. A telescoping retracting hook for aircraft comprising an extendable retractable hook device adapted to be pivotally mounted on an aircraft, and means for moving said hook device between a non-operative raised position and an operative lowered position and for extending and retracting said hook device while in the lowered operative position, said means including a hydraulic system for positively controlling the movement of said hook device.

3. A telescoping retracting hook for aircraft comprising an extendable retractable hook device adapted to be pivotally mounted on an aircraft, means for moving said hook device between a non-operative raised position and an operative lowered position and for extending and retracting said hook device while in the lowered operative position, said means including a hydraulic system for positively controlling the movement of said hook device and spring means located within said hydraulic system for lowering and extending said hook device upon failure of said hydraulic system.

4. A telescoping retracting hook for aircraft comprising an extendable retractable hook device adapted to be pivotally mounted on an aircraft, means for moving said hook device between a non-operative raised position and an operative lowered position and for extending and retracting said hook device while in the lowered operative position, said means including a hydraulic system for controlling the movement of said hook device, said hydraulic system including a hook jack in said pivotally mounted hook device, a dummy jack for hydraulically retracting said hook device, a linkage jack for pivotally moving said hook device, a hydraulic pressure supply and a valve for controlling the flow of pressure fluid to and from said jacks to operate said hook device.

5. A telescoping retracting hook for aircraft comprising an extendable retractable hook device adapted to be pivotally mounted on an aircraft, means for moving said hook device between a non-operative raised position and an operative lowered position and for extending and retracting said hook device while in the lowered operative position, said means including a hydraulic system for controlling the movement of said hook device and spring means for lowering and extending said hook device upon failure of said hydraulic system, said hydraulic system including a hook jack in said pivotally mounted hook device, a dummy jack cooperating with said hook jack for hydraulically retracting said hook device, a linkage jack for pivotally moving said hook device, a hydraulic pressure supply and a valve for controlling the flow of pressure fluid to and from said jacks to operate said hook device.

6. A telescoping retracting hook for aircraft comprising an extendable retractable hook element pivotally mounted on the aircraft for movement from a non-operative raised position to an operative lowered position and vice versa in combination with a hydraulic system for positively moving said hook element from a raised position to a lowered position and then extending it to an operative position and thereafter retracting it and then raising it to a non-operative position and spring means located within said hydraulic system normally urging said hook element to a lowered and extended operative system.

7. A telescoping retracting hook for aircraft comprising an extendable retractable hook element pivotally mounted on the aircraft for movement from a non-operative raised position to an operative lowered position and vice versa in combination with a hyrdaulic system for moving said hook element from a raised position to a lowered position and then extending it to an operative position and thereafter retracting it and then raising it to a non-operative position, said hydraulic system including a hook jack comprising a hook barrel pivoted on the aircraft, an inner barrel within said hook barrel, a hook element sleeve extending into said hook barrel, an inner gland on said hook element sleeve about said inner barrel and an outer gland on said inner barrel within said sleeve forming an expandable chamber between said glands.

8. A telescoping retracting hook for aircraft comprising an extendable retractable hook element pivotally mounted on the aircraft for movement from a non-operative raised position to an operative lowered position and vice versa in combination with a hydraulic system for moving said hook element from a raised position to a lowered position and then extending it to an operative position and thereafter retracting it and then raising it to a non-operative position and spring means normally urging said hook element to a lowered and extended operative system, said hydraulic system including a hook jack comprising a hook barrel pivoted on the aircraft, an inner barrel within said hook barrel, a hook element sleeve extending into said hook barrel, an inner gland on said hook element sleeve about said inner barrel and an outer gland on said inner barrel within said sleeve forming an expandable chamber between said glands, a passageway from said chamber through the inner barrel, a flexible tube connected to said inner barrel, a dummy jack to which said flexible tube is connected, a linkage jack, a linkage system connecting said linkage jack to said hook barrel to pivot the same, a pressure supply including a one-way fluid pump, a reservoir, and a four-way valve, and hydraulic tubes connecting said jacks, four-way valve and reservoir.

9. A telescoping retracting hook for aircraft comprising an extendable retractable hook element pivotally mounted on the aircraft for movement from a non-operative raised position to an operative lowered position and vice versa in combination with a hydraulic system for moving said hook element from a raised position to a lowered position and then extending it to an operative position and thereafter retracting it and then raising it to a non-operative position and spring means normally urging said hook element to a lowered and extended operative system, said hydraulic system including a hook jack comprising a hook barrel pivoted on the aircraft, an inner barrel within said hook barrel, a hook element sleeve extending into said hook barrel, an inner gland on said hook element sleeve about said inner barrel and an outer gland on said inner barrel within said sleeve forming an expandable chamber between said glands, a passageway from said chamber through the inner barrel, a flexible tube connected to said inner barrel, a dummy jack to which said flexible tube is connected, a linkage jack, a linkage system connecting said linkage jack to said hook barrel to pivot the same, a pressure supply including a one-way fluid pump, a reservoir, and a four-way valve and hydraulic tubes connecting said jacks, four-way valve and reservoir, said dummy jack including a cylinder, a piston movable in said cylinder, one of said tubes connecting said hook jack to said dummy jack cylinder at one side of said piston, a valve within said cylinder operable by said piston for connecting said hook jack tube therethrough to a tube branching to said valve and to said linkage jack, another of said hydraulic tubes connecting said dummy jack cylinder at the other side of said piston, and a valve connection in said linkage jack for connecting said last-mentioned tube to another of said tubes connecting to said four-way valve.

JOHN RUSSELL CLARK.

REFERENCES CITED

The following references are of record in the file of this patent:

UNITED STATES PATENTS

| Number | Name | Date |
|---|---|---|
| 1,279,500 | Berry | Sept. 24, 1918 |
| 2,194,594 | Halley | Mar. 26, 1940 |
| 1,922,371 | Jones | Aug. 15, 1933 |

FOREIGN PATENTS

| Number | Country | Date |
|---|---|---|
| 546,288 | British | July 6, 1942 |